(12) United States Patent
Ou et al.

(10) Patent No.: US 10,360,342 B2
(45) Date of Patent: Jul. 23, 2019

(54) METHOD, SYSTEM, AND STORAGE MEDIUM FOR ENGINEERING CHANGE ORDER SCHEME IN CIRCUIT DESIGN

(71) Applicant: TAIWAN SEMICONDUCTOR MANUFACTURING COMPANY LTD., Hsinchu (TW)

(72) Inventors: Hung-Chih Ou, Kaohsiung (TW); Chun-Yao Ku, Taipei (TW); Wen-Hao Chen, Hsin-Chu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 195 days.

(21) Appl. No.: 15/704,654

(22) Filed: Sep. 14, 2017

(65) Prior Publication Data
US 2019/0080037 A1 Mar. 14, 2019

(51) Int. Cl.
*G06F 9/455* (2018.01)
*G06F 17/50* (2006.01)

(52) U.S. Cl.
CPC ...... *G06F 17/5081* (2013.01); *G06F 17/5031* (2013.01); *G06F 2217/06* (2013.01)

(58) Field of Classification Search
USPC .......................... 716/111, 113, 134
See application file for complete search history.

(56) References Cited

U.S. PATENT DOCUMENTS

| 9,977,857 B1 * | 5/2018 | Ku ....................... G06F 17/5081 |
| 2011/0309492 A1 * | 12/2011 | Chi ....................... H01L 21/568 |
| | | 257/737 |
| 2011/0316155 A1 * | 12/2011 | Ko ....................... H01L 25/105 |
| | | 257/738 |

* cited by examiner

*Primary Examiner* — Brian Ngo
(74) *Attorney, Agent, or Firm* — WPAT, P.C., Intellectual Property Attorneys; Anthony King (57) ABSTRACT

A method performed by at least one processor includes: accessing a layout of an integrated circuit (IC), where the layout comprises a first cell coupled to a metallization unit and the metallization unit includes one of a first via pillar (VP) structure and a single-via stacking structure; determining whether the layout meets a timing constraint; and performing, in response to the layout being determined as failing the timing constraint, an engineering change order (ECO) operation by replacing the metallization unit with a second VP structure.

20 Claims, 7 Drawing Sheets

METHOD, SYSTEM, AND STORAGE MEDIUM FOR ENGINEERING CHANGE ORDER SCHEME IN CIRCUIT DESIGN

BACKGROUND

In advanced semiconductor technologies, the continuing reduction in device size and increasingly complicated circuit designs have made the designing and fabrication of ICs more challenging and costly. The circuit complexity and device density may lead to design errors, such as violation of design rules, layout congestion, timing errors, noise, etc. In order to correct errors without resuming the design cycle, a redesign stage, known as an engineering change order (ECO), is introduced for fixing errors in an efficient manner.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "cell" used throughout the present disclosure refers to a group of low-level circuit patterns to implement specific functionalities, such as AND, NAND, XOR, or other features. A cell is usually designed to be optimized in several aspects and meets the design criteria, such as the area, timing, and power. Thus, circuit designers can benefit from the cells since they can construct a high-level circuit concept and implement the circuit details by taking advantage of the established cells.

The term "via pillar" (VP) or "VP structure" used throughout the present disclosure refers to an established circuit that is placed in a metallization layer of a layout and employed for conductively interconnecting different circuit nodes or cells underlying the metallization layer. In some cases a VP structure is characterized in a cell-like representation and a variety of VP structures can be accessed through a database or library. A VP structure usually includes stacked metal layers and via layers. The metals layers and via layers are overlapped with each other to form a conductive wiring path by metal lines and metal vias in the metal layers and via layers, respectively. Moreover, a VP structure may take advantage of the metal lines and metal vias to form a mesh-like wiring structure. An effective conduction path of the VP structure comprises multiple parallel conduction links and can achieve a reduced effective resistance of the metallization layer.

Figure 1:
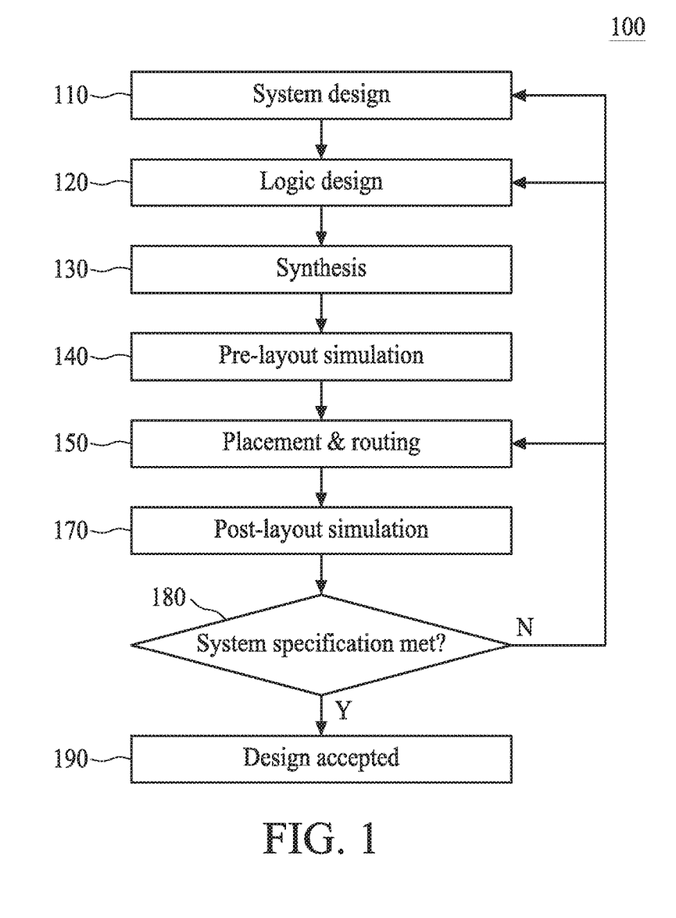
FIG. 1 is a schematic diagram illustrating a design flow of a layout of an integrated chip (IC), in accordance with some embodiments.

FIG. 1 is a schematic diagram illustrating a design flow 100 of a layout of a semiconductor integrated chip (IC), in accordance with some embodiments. The design flow 100, employed for designing semiconductor chips, utilizes one or more electronic design automation (EDA) tools to perform operations. A workstation or personal computer is typically used in executing the tools to accomplish the design flow 100. The design flow 100 comprises a system design stage 110, a logic design stage 120, a synthesis stage 130, a pre-layout simulation stage 140, a placement and routing development stage 150 and a post-layout simulation stage 170.

Initially, in the system design stage 110, a systematic architecture for the chip of interest is provided with a high-level description. In stage 110, the chip functions and performance requirements are determined according to a design specification. The chip functions are usually represented by respective schematic functional modules or blocks. In addition, an optimization or performance trade-off may be sought to achieve the design specification with affordable cost and power.

In the logic design stage 120, the functional modules or blocks are described in a register transfer level (RTL) using a hardware description language. Commercially available language tools are generally used, for example, Verilog or VHDL. In an embodiment, a preliminary functionality check is performed in stage 120 to verify whether the implemented functions conform to the specification set forth in stage 110.

Subsequently, in the synthesis stage 130, the modules in RTL descriptions are converted into a netlist data where the circuit structure, e.g., logic gates and registers, of each function module are established. In some embodiments, technology mapping of logic gates and registers to available cells in the standard cell libraries is conducted. Further, the netlist data is provided to describe the functional relationship of the chip at a gate level. In an embodiment, the netlist data is transformed from the gate-level view to a transistor-level view.

Subsequently, the gate-level netlist data is verified at the pre-layout simulation stage 140. During the verification process of stage 140, if some of the functions fail the verification in the simulation, the design flow 100 may be paused temporarily or may go back to stage 110 or 120 for further modification. After the pre-layout simulation stage 140, the chip design has passed a preliminary verification and completed the front-end design process. Consequently, a back-end physical design process follows.

In the placement and routing stage 150, a physical architecture representing the chip determined during the front-end process is implemented. The layout development involves a placement operation and a routing operation in series. Detailed structure and associated geometry for the components of the chip are determined in the placement operation. Interconnects among different components are routed subsequent to the placement operation. Both placement and routing operations are performed to meet a design rule check (DRC) deck so that the manufacturing requirement of the chip is fulfilled.

In an embodiment, a layout parameter extraction (LPE) or RC extraction (RCX) operation is conducted to derive layout-dependent parameters, such as parasitic resistance and capacitance, resulting from the developed layout. Consequently, a post-layout netlist data is then generated, which includes the layout-dependent parameters.

In an embodiment, if any error, such as a timing violation, is found in the placement and routing stage 150, e.g., a certain portion of the layout does not conform to the chip design criteria, an engineering change order (ECO) operation may be employed to correct the error. In some examples, the ECO operation changes the layout in a neighborhood of the problematic layout portion and leaves the remaining portions of the layout unchanged. As a consequence, the time-consuming and costly process of redesigning the layout from scratch can be avoided. In some embodiments, some layout portions or cells may be modified or replaced with other cells through the ECO operation. Alternatively, spare cells or buffer cells are inserted where appropriate to resolve timing issues.

In the post-layout simulation stage 170, a physical verification is performed taking into consideration the parameters acquired in previous stages. A simulation of transistor-level behavior is conducted to examine whether the chip performance meets the required system specifications. In some embodiments, the post-layout simulation is performed to minimize possibility of electrical issues or lithographic issues during the chip manufacturing process.

Next, it is determined during stage 180 whether the post-layout netlist meets the design specifications. If affirmative, the circuit design is accepted in stage 190 and then signed off accordingly. The chip is then manufactured according to the accepted post-layout netlist. However, if the result of the post-layout simulation is unfavorable, the design flow 100 loops back to previous stages for tuning of functionalities or structures. For example, the design flow 100 may loop back to stage 150 where the layout is re-developed to resolve issues from a physical perspective. Alternatively, the design flow 100 may retreat to an earlier stage 110 or 120 to recast the chip design from a functional level in case the problems cannot be resolved within the scope of the back-end process.

The design flow 100 illustrated in FIG. 1 is exemplary. Modifications to the above-mentioned stages, such as change of order for the stages, partition of the stages, and deletion or addition of stages, are within the contemplated scope of the present disclosure.

In the present disclosure, the VP (or VP structure) is incorporated during the phase of engineering change order (ECO) of stage 150 to resolve the timing error in the placement and routing operation. The VP structure enjoys the advantage of a reduced resistance as compared to a single-via stacking configuration. Through appropriate data association of VP structures between the placement-and-routing phase and the ECO phase, the timing issues can be managed more efficiently. The ECO-refined layout can successfully eliminate the timing issue while achieving a better tradeoff between the design requirements such as power and chip area.

Figure 2A:
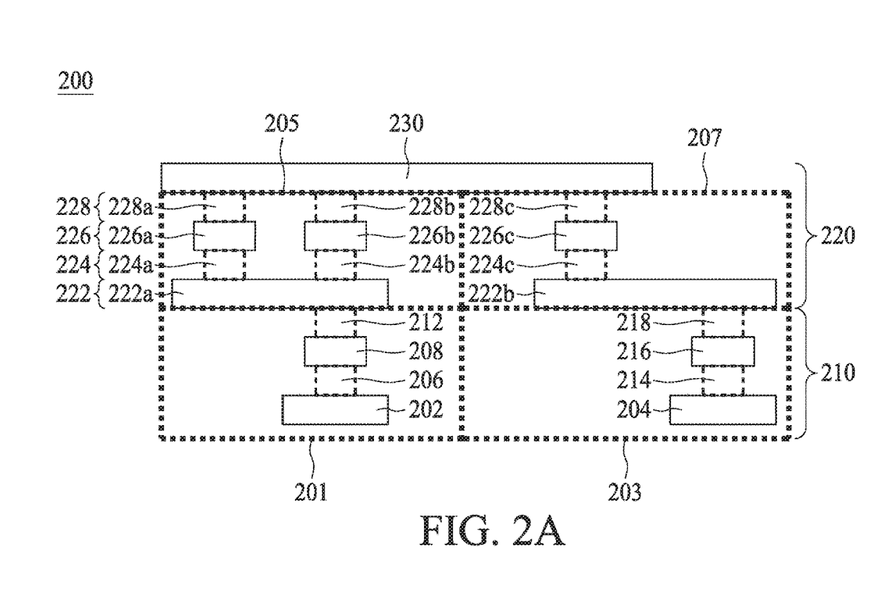
FIG. 2A is a schematic cross-sectional diagram of a layout in accordance with some embodiments.

FIG. 2A is a schematic cross-sectional diagram of a layout 200 in accordance with some embodiments. The layout 200 includes a substrate layer 210 and a metallization layer 220 over the substrate layer 210. The substrate layer 210 includes a first cell 201 and a second cell 203, and the metallization layer 220 includes a first metallization unit 205 and a second metallization unit 207.

The substrate layer 210 may be fabricated on a semiconductor substrate, such as silicon substrate or the like. The first cell 201 or the second cell 203 may be accessible from a standard cell library and may perform specific functionalities such as an AND gate, an OR gate, a NAND gate, a NOR gate, an XOR gate, a flip-flop, or the like. In an embodiment, the first cell 201 or the second cell 203 may act as a transmitter, receiver, buffer, inverter, multiplexer, latch, or the like. In an embodiment, the substrate layer 210 includes wiring patterns or metal lines conductively connecting the cells 201, 203. In an embodiment, the first cell 201 includes a transmitter 202 and the second cell 203 includes a receiver 204. The first cell 201 or the second cell 203 needs to conform to the design criteria in order to achieve proper function. For example, the first cell 201 is required to support a minimal output current in order to drive the second cell 203 normally. In some embodiments, the transmitter 202 is conductively coupled to the first metallization unit 205 through a metal via 206, a metal line 208 and a contact 212. In some embodiments, the receiver 204 is coupled to the second metallization unit 207 through a metal via 214, a metal line 216 and a contact 218. In some embodiments, the first cell 201 or the second cell 203 has other terminals (not separately shown), such as input terminal, output terminal, power or ground, in order to transmit or receive power and signal.

In an embodiment, the metallization layer 220 is configured to conductively couple the individual circuits or cells within the substrate layer 110. In an embodiment, the metallization layer 220 is configured to conductively couple the cells of the substrate layer 210 with external components. The metallization layer 220 may comprise a plurality of metallization units and interconnected metal lines conductively connecting the metallization units. In the depicted embodiment, the first cell 201 and the second cell 203 are conductively coupled to each other through the first metallization unit 205 and the second metallization unit 207. The first metallization unit 205 and the second metallization unit 207 are conductively connected to each other through a metal line 230.

The first metallization unit 205 includes metal layers 222 and 226. The metal layer 222 includes a first metal line 222a. The metal layer 226 at least includes a first metal line 226a and a second metal line 226b. Further, the first metallization unit 205 includes via layers 224 and 228. The via layer 224 at least includes a first metal via 224a and a second metal via 224b. The via layer 228 at least includes a first metal via 228a and a second metal via 228b. Two conduction links are thus formed between the metal layer 222 and the metal line 230. The first conduction link is constructed by the metal line 224a, the metal via 226a and the metal line 228a, and the second conduction link is constructed by the metal line 224b, the metal via 226b and the metal line 228b. In an embodiment, the first metallization unit 205 is conductively coupled to the first cell 201 through the metal line 222a.

In the present embodiment, the second metallization unit 207 shares the metal layers 222 and 226 with the first metallization unit 205. In some embodiments, however, the first metallization unit 205 and the second metallization unit 207 have different numbers of metal layers or via layers. The metal layer 222 includes a second metal line 222b. Further, the metal layer 226 has a third metal line 226c. The via layers 224 and 228 include a third metal via 224c and 228c, respectively. A conduction link in the second metallization unit 207 is constructed by the metal line 222b, the metal via 224c, the metal line 226c, and the metal line 228c. In an embodiment, the second metallization unit 207 is conductively coupled to the second cell 203 through the metal line 222b. In some embodiments, the first metallization unit 205 and the second metallization unit 207 are merged as a single metallization unit including the metal line 230.

A major difference between the first metallization unit 205 and the second metallization unit 207 lies in the mesh-like conductive structure of the first metallization unit 205. Two or more conduction links are established in the mesh between the metal layer 222 and 230 so as to increase the amount of conduction current. The first metallization unit 205 is also referred to a via pillar (VP) structure. By comparison, a single-via stacking structure is shown in the second metallization unit 207, in which only one conduction path is established. The effective resistance of the first metallization unit 205 is thus less than that of the second metallization unit 207. As a result, the resistive-capacitive (RC) time delay is shortened and the timing violation issue may be resolved accordingly. The amount of reduction of resistance may be proportional to the number of conduction links formed in the first metallization unit 205.

Figure 2B:
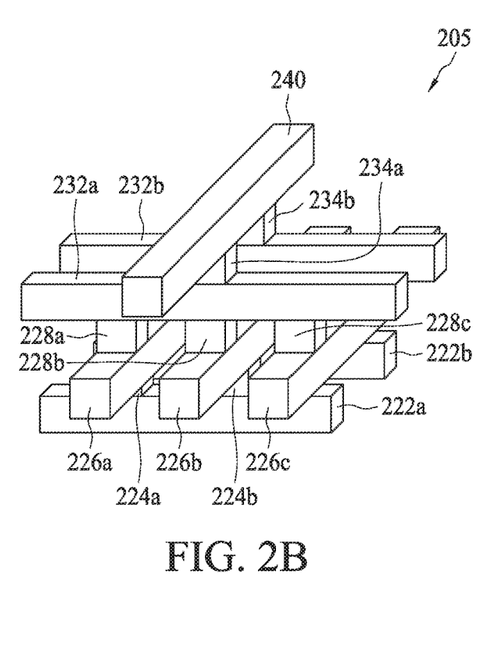
FIG. 2B is a schematic perspective diagram of a via pillar structure illustrated in FIG. 2A in accordance with some embodiments.

FIG. 2B is a schematic perspective diagram of the VP structure 205 in FIG. 2A, in accordance with some embodiments. The exemplary VP structure 205 has four metal layers 222, 226, 232 and 240. Adjacent metal layers are conductively coupled by intervening via layers 224, 228 and 234. Each metal layer has metal lines substantially parallel to each other. A metal via is disposed to conductively couple an underlying metal line with an overlying metal line. For example, a metal via 228c is used to conductively couple a metal line 226c in the metal layer 226 with a metal line 232a of the metal layer 232. In some embodiments, the VP structure 205 includes an inter-metal dielectric (IMD) configured to fill the remaining portions of the VP structure 205 and insulate the metal lines and metal vias thereof from other components. The IMD may be formed of dielectric materials, such as silicon oxide. In some embodiments, the numbers of metal vias or metal lines in different via layers or metal layer are not equal and can be adjusted in different layers according to design requirements.

In most cases, a VP structure may decrease the time delay of the metallization layer 205 through a reduced resistance. However, the VP structure is formed at the price of an increased routing area or increased power requirement. In some embodiments, more metal layers may be necessary in order to accommodate additional metal lines and metal vias. Thus, employing VP structures in place of all single-via stacking structures in an initial placement and routing phase may not be an optimal design approach. In the present disclosure it is found that in order to manage the timing issue, efforts for reducing the resistance can be made either to supply a greater current value using an upgraded cell or to reduce the resistance of the metallization layer, or both. However, existing layout refinement procedures during the ECO phase only allow replacement of cells by using higher-powered cells or by inserting an additional buffer cell as a remedy. As such, unnecessary power or chip area may be consumed. It is thus desirable to introduce the VP into the layout refinement procedure wherever appropriate.

Figure 3:
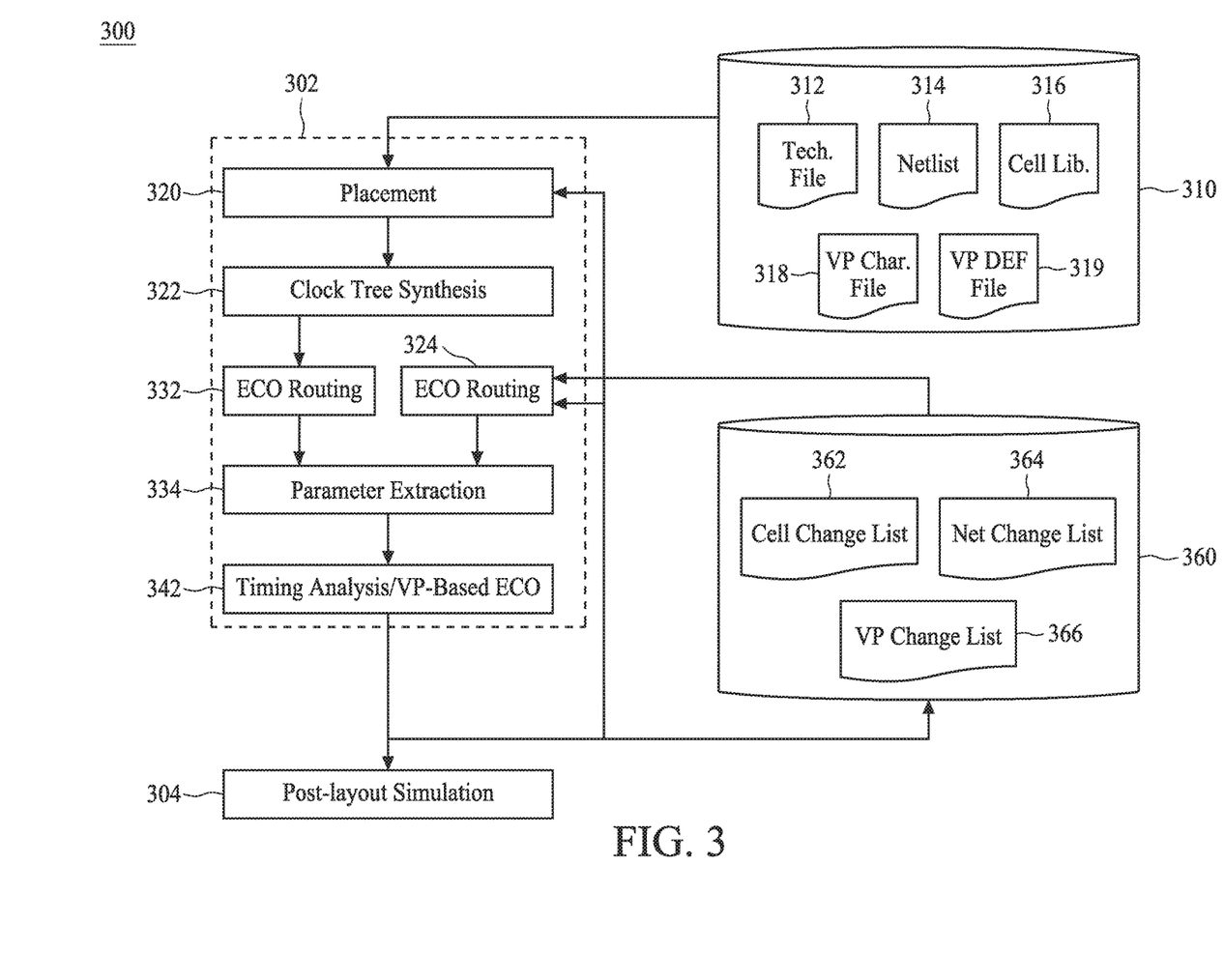
FIG. 3 is a design flow of a placement and routing procedure in accordance with some embodiments.

FIG. 3 is a design flow of a placement and routing procedure 300 in accordance with some embodiments. The flow 300 includes a functional block 302 that corresponds to the stage 150 in FIG. 1. The flow 300 is provided with a database 310 which includes a technology file 312, a layout netlist 314, a cell library 316, a VP characterization file 318 and a VP design exchange format (DEF) file 319. The technology file 312 provides information on technical requirements during different stages of manufacturing the chip, such as line width, geometry limitation, and placement rule. The layout netlist 314 includes an abstract representation in which the circuit elements and the connection relationships between the elements of different circuits are characterized. In an embodiment, the netlist may be generated in stage 130 of FIG. 1. The cell library 316 includes available standard cells for implementing the placement of the layout, for example, the substrate layer 210 in FIG. 2A. The VP characterization file 318 includes identities of a variety of VP structures along with their attributes such as types, materials, layer configurations and geometries. The VP DEF file 319 provides available VP structures for the layout. The VP DEF file 319 may also provide a preference ranking for pairing a cell with a corresponding VP structure. In some embodiments, the ranking may be represented by a beneficial parameter (e.g., cost functions or matching feasibility) for the pair of the cell and the VP structure.

In step 320, an initial placement is performed based on the database 310, e.g., the technology file 312, the layout netlist 314 and the cell library 316. In an embodiment, it is determined whether the placed layout conforms to the design criteria. If a placement error is found, a layout refinement operation may be performed.

In step 322, a clock tree is synthesized for the placed layout. For example, a clock tree is generally used for distributing a common clock signal to many sequential elements, which include flip flops, latches, and memories, so that the sequential elements have a uniform timing. In step 332, a routing operation is performed to interconnect the cells of the layout. In an embodiment, different cells are interconnected through one or more metallization layers. In an embodiment, each of the metallization layers may be formed by combinations of single-via stacking structures or VP structures. If it is determined that the routed layout conforms to the design specification, the flow 300 proceeds to step 334.

In step 334, a parameter extraction operation is performed to calculate accurate layout dependent parameters resulting from the placement and routing operation. For example, the derived capacitance and resistance values of each metallization layer or each connecting wire between the cells that are incorporated in the clock tree synthesis 322 or the routing stage 332 are taken into consideration.

In step 342, a timing analysis operation is performed to examine whether the current layout meets the design criteria considering the actual layout geometry and layout-induced parameters. In an embodiment, if it is determined that the layout meets the requirement of the timing analysis, the flow 300 proceeds to step 304 of a post-layout simulation operation, which corresponds to stage 170 in FIG. 1. If it is determined that the layout fails the timing analysis, that means at least one timing error is found, then a VP-based ECO operation might be performed along with the timing analysis. Operation details of step 342 are illustrated with reference to FIG. 4.

If the VP-based ECO operation is activated during step 342 to resolve the timing error, the flow 300 returns back to step 324 to perform an ECO routing operation on the ECO-refined layout. In some examples when the VP-based ECO operation introduces new cells to the layout, the flow 300 returns back to step 320 for performing the placement. In the meantime, information on resultant layout changes through the VP-based ECO operation is fed into a VP-ECO database 360. The VP-ECO database 360 may include a cell change list 362, a net change list 364 and a VP change list 366. The cell change list 362 records any cell modifications through the VP-based ECO operation, the net change list 364 records any connection changes between circuit nodes against the previously produced netlist 314, and the VP change list 362 records any updates of VP structures in the layout. The updated information of the database 360 is provided to step 324 in which the changes to the previous netlist version are highlighted. The conducted routing and design rule check tasks can be limited to the highlighted regions rather than the entirety of the layout. Some other layers or areas on the same layer may not need to be rerouted and reexamined in step 324. The convergence time for the ECO routing in step 324 is thus greatly reduced as compared to the initial routing step 322.

In some examples, if it is determined that not all of the timing errors can be resolved through the ECO operations, the flow 300 loops back to an earlier stage, e.g., the stage 320 to recast the layout placement. In some embodiments, although not shown, the flow 300 may need to return to the front-end process if the placement operation cannot resolve the timing errors.

Figure 4:
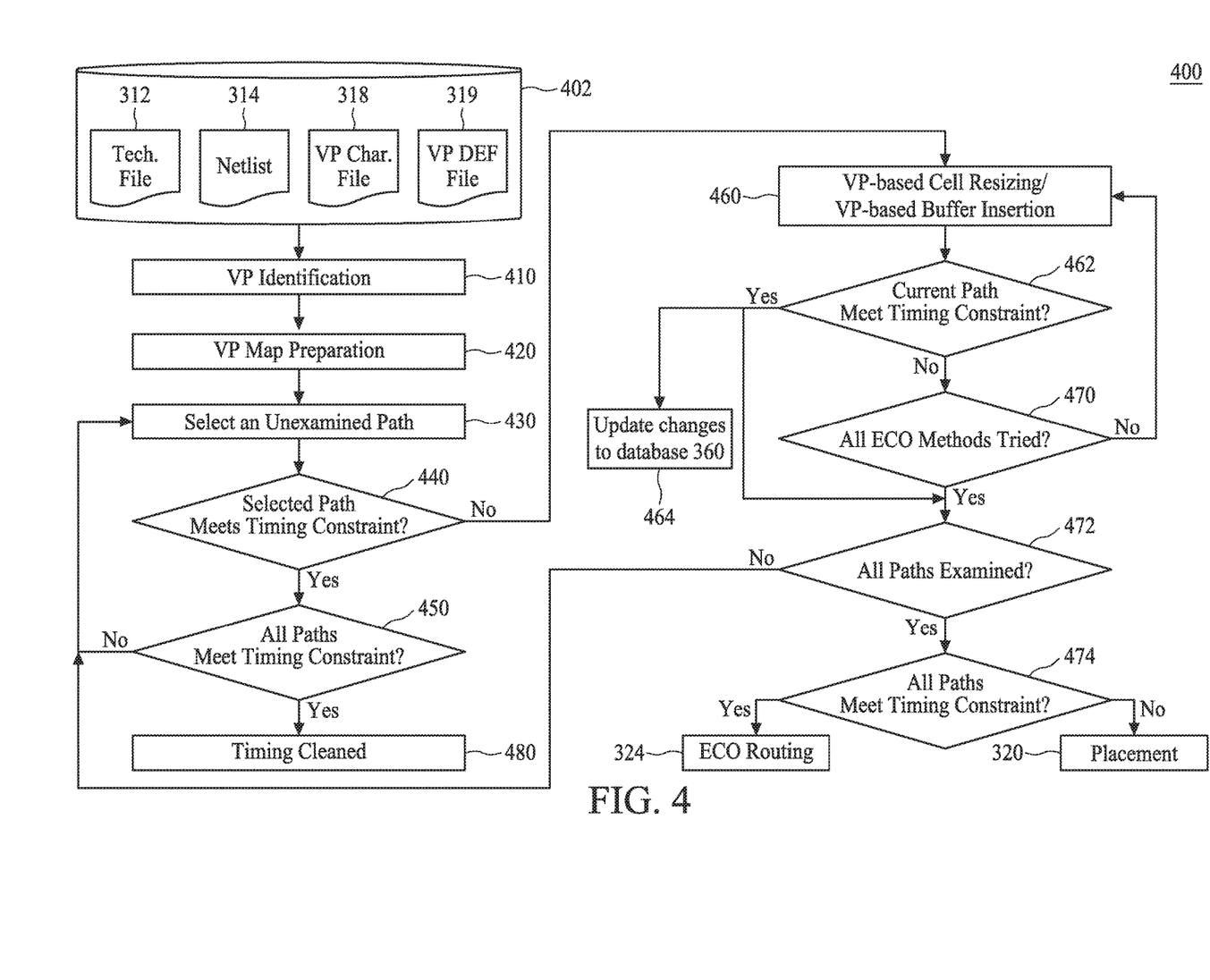
FIG. 4 is a design flow of a via pillar-based ECO operation in accordance with some embodiments.

FIG. 4 is a design flow of a VP-based ECO operation 400 in accordance with some embodiments. A database 402 is provided and includes the technology file 312, the netlist 314, the VP characterization file 318 and the VP DEF file 319. In an embodiment, the netlist 314 may include an updated netlist during iterations of the flow 400.

In step 410, available VP structures are identified. As discussed previously, the VP structure may have different attributes suitable for different cells and such characterization information is accessible from the VP characterization file 318. Once the initial layout is completed, the types and properties of the cells used in the layout are also ascertained. In an embodiment, some VP structures have been placed to couple to corresponding cells during the initial placement operation. Such correspondence information can also be retrieved from the VP DEF file 319. In an embodiment, any information on an available VP structure that corresponds to a specific cell but is not yet placed can also be found in the VP DEF file 319. In an embodiment, in the VP DEF file 319 one cell may be paired with more than one VP structure, either currently used or not yet placed.

In step 420, a VP preference map is prepared for all of the cells identified in the layout provided by step 320 of FIG. 3. The preference map enumerates preferred VP structures corresponding to the used cells. A prioritization scheme is conducted to set up the preference ranking. In an embodiment, the priority of a candidate VP structure is represented by a rank index or a parameter that may be derived through some rules. In an embodiment, the rule examines the matching degree between a cell-VP pair that is to be matched. In an embodiment, the rule takes into account the time delay of the VP structure, or the surroundings of the cell and the VP structure, e.g., the distance between the cell and the VP structure or the circuit density around the cell. Therefore, the preference rank for the cells and their corresponding candidate VP structures may be different according to different layout topologies.

In step 430, a timing analysis is started. At the beginning, an unexamined timing path is selected. Throughout the present disclosure, a timing path may refer to an interconnected conduction path originating at an input terminal or a register and ending at an output terminal or another register. In an embodiment, the timing path may be cascaded by cells, metallization units and interconnected metal lines conductively connecting the cells and the metallization units. In some embodiments, the timing path is established such that signal transmission is completed across the timing path within a clock period. As such, the timing analysis is performed to determine whether the sum of the delays of a timing path contributed by the cells, metallization units and the wiring patterns exceeds the predetermined timing constraint. In an embodiment, the timing constraint is a clock period for the chip. Next, the flow proceeds to step 440 to examine whether the selected timing path meets the predetermined timing constraint. If the current timing path under analysis has a time delay shorter than a time threshold such as a clock period, then the flow 400 proceeds to step 450 to determine whether all timing paths have been examined.

If it is determined in step 450 that not all timing paths have been examined, then the flow 400 returns to step 430 to select another unexamined timing path. If all of the timing paths have been examined and each timing path has a corresponding time delay shorter than the time threshold, then no timing fixing task is required. The flow 400 then proceeds to step 480 in which timing analysis is completed without any ECO efforts. The timing analysis is cleaned and the flow 400 proceeds to subsequent stages, such as stage 170 in FIG. 1.

Figure 5:
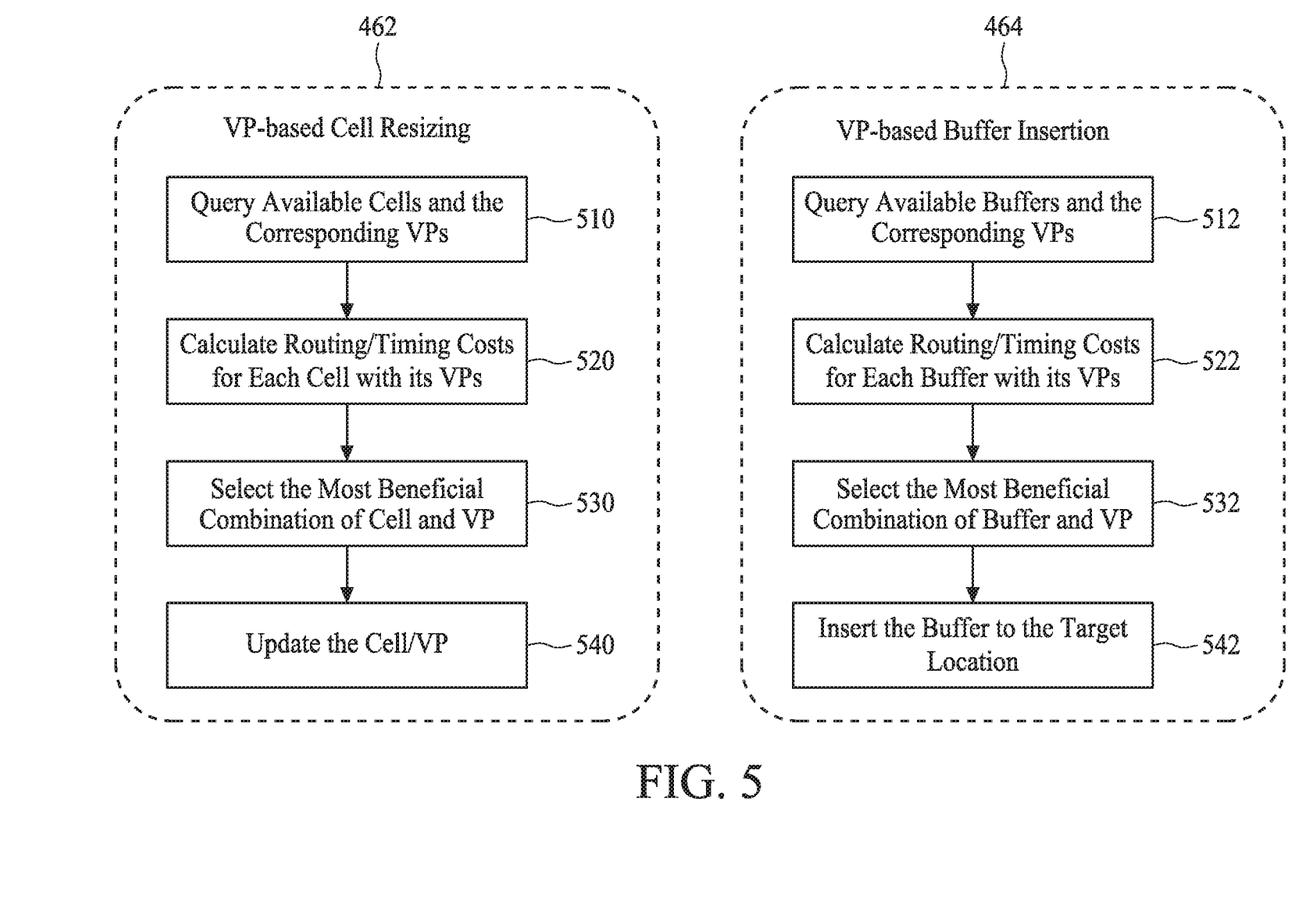
FIG. 5 is a detailed design flow of the via pillar-based ECO procedure in FIG. 4, in accordance with some embodiments.

If it is determined in step 440 that the current timing path fails the timing analysis, a VR-based ECO operation is started accordingly in step 462. The VR-based ECO operation in step 462 may include a VP-based cell resizing operation or a VP-based buffer insertion operation, whose detailed operations are illustrated in FIG. 5. Furthermore, in an embodiment, steps 410 and 420 can be performed subsequent to step 440 when it is determined to call for ECO as remedy. In step 462, it is determined whether the current timing path meets the timing constraints. If affirmative, the flow 400 proceeds with step 464 in which the updated items to the current timing path are recorded into the VP-ECO database 360. The updated items for the cells, layout netlist and VP structures are recorded in the lists 362, 364 and 366, respectively. The update type for each of the cells or VP structures may include an addition action, a removal action or a type change action. If it is determined that the current timing path does not meet the timing constraints, the flow 400 proceeds with step 470 to determine whether all VP-based ECO methods have been tried. In an embodiment, VP-based cell resizing is preferred over VP-based buffer insertion in some cases and may be considered as priority because the cell resizing approach results in less layout changes than its buffer insertion counterpart. However, if the VP-based cell resizing method still cannot resolve the timing issue, the buffer insertion approach may be used. If it is determined that not all VP-based ECO methods have been tried, the flow 400 loops back to step 460 to consider remaining approaches.

If all of the VP-based ECO methods have been tried for the current timing path, either successful or unsuccessful, the flow 400 proceeds with step 472 to determine whether all timing paths have been examined. If not all timing paths have been examined, the flow loops back to step 430 to select another unexamined path. If all timing paths have been examined and received ECO operations wherever necessary, then the flow 400 proceeds with step 474 to determine whether all timing paths meet the timing constraints.

If all timing paths have passed the timing analysis and found to meet the timing constraints, it is determined that no timing errors are found through the VP-based ECO operations. The flow 400 proceeds with step 320 or step 324 in which an updated placement operation or routing operation for the ECO-refined layout is performed. If at least one timing path is found which does not meet the timing constraints, it is required that the flow 400 loops back to an earlier stage, such as step 320, to further refine the layout. In an embodiment, other stages earlier than the placement stage 320 may also be possible.

FIG. 5 is a detailed design flow of the VP-based ECO method 460 in FIG. 4, in accordance with some embodiments. Procedures for VP-based cell resizing and VP-based buffer insertion are illustrated in steps 462 and 464, respectively. In step 510, information of all cells and their corresponding VP structures for the current timing path are queried. Such information can be retrieved from the preference map in step 420. In step 520, placement costs are calculated for each cell along with its corresponding VP structures (termed as a cell-VP pair). In an embodiment, the placement cost of a cell-VP pair may include a combination of a routing cost and a timing cost. The routing cost may include an expense for routing, such as the increased circuit density or an increased area of metal layers in the VP structure with respect to its corresponding cell. The timing cost may be related to a time delay accounted for by the VP or the cell.

In step 530, a most beneficial combination of cell-VP pair is selected as a target cell and a target VP (i.e., the target cell-VP pair) among all candidate cell-VP pairs. In an embodiment, the placement cost of the most beneficial cell-VP pair is compared against the cost of the cell arrangement of the current timing path. In step 540, if the target cell-VP pair is determined to outperform the current timing path, the target cell and target VP structure are updated to the current timing path in the layout. In an embodiment, in the target cell-VP pair, only one of the cell and the VP structure is changed while the other is kept the same as the current design. When a cell is changed or resized, the cell type may be maintained but the cell size or the cell driving capability is upgraded. A cell of a same type and having a larger cell size or an upgraded driving capability implies identical connection relationships with an increased fan-out current value at the output. The resultant resistance of the timing path at issue can be thus reduced. In an embodiment where the VP structure is changed, the target VP structure may replace the currently used VP structure or single-via stacking structure so as to reduce the resistance of the metallization layer.

If step 464 is selected, a VP-based buffer insertion method is employed as the ECO method. In step 512, information of all buffer cells and their corresponding VP structures (termed as buffer-VP pairs) for the current timing path are queried. In step 522, placement costs are calculated for each buffer cell along with its corresponding VP structure. In an embodiment, the placement cost of a buffer-VP pair may include a combination of a routing cost and a timing cost. The routing cost may include an expense for routing, such as the increased circuit density or an increased area of the buffer cell or the metal layers. The timing cost may be related to a time delay accounted for by the VP or the buffer cell. In step 532, a most beneficial combination of buffer cells and VP structures is selected as a target buffer cell and a target VP (target cell-VP pair) among all buffer-VP pairs. In an embodiment, the cost of the most beneficial buffer-VP pair is compared against the cost of the current timing path.

In step 542, if the target buffer-VP pair is determined to outperform the current timing path, the target buffer cell and target VP structure are updated to the current timing path in the layout. The target buffer cell is coupled to the target VP structure in the layout. In an embodiment, for a target buffer-VP pair, only one of the buffer cell and the VP structure is changed while the other is kept the same as the current design. When a new buffer cell is incorporated, it may provide a greater driving capability. The resultant resistance of the timing path of interest can be thusly reduced. In an embodiment where the VP structure is changed along with the buffer insertion, the target VP structure may replace the currently used VP structure or single-via stacking structure.

In an embodiment, a timing path is composed of several timing stages where a timing stage may originate at one cell and end at another cell. Accordingly, the VP-based ECO operations in step 460 may be performed on a stage-by-stage basis. In an embodiment, the timing path is firstly partitioned into several timing stages, wherein each timing stage is subjected to the ECO-based methods in succession. Referring to FIG. 4, the iterations between steps 460 and 470 may proceed for each timing stage of the timing path. In an embodiment, more than one stage is updated and the resulting timing path may include more than one target cell-VP pair or buffer-VP pair for different timing stages. Under that circumstance, steps 520 and 522 may accumulate the costs of different timing stages in a same timing path and select the updated cell-VP pair or buffer-VP pair based on accumulated placement costs calculated in previous stages in addition to the incurred costs of the current stage.

Existing ECO approaches only allow pure cell resizing or pure buffer insertion to resolve timing errors. Unnecessary increases to the layout area and operation power may be introduced accordingly. In contrast, the stress of the increased cell area or operation power may be reduced through the introduction of VP structures at the ECO phase. By reducing the resistance of the metallization layer (e.g., layer 220 in FIG. 2A), the actual amount of area increase can be reduced. A smaller buffer cell or a smaller increase of the cell area may be sufficient to meet the timing constraints. Both the area and power savings can be attained accordingly.

Figure 6A:
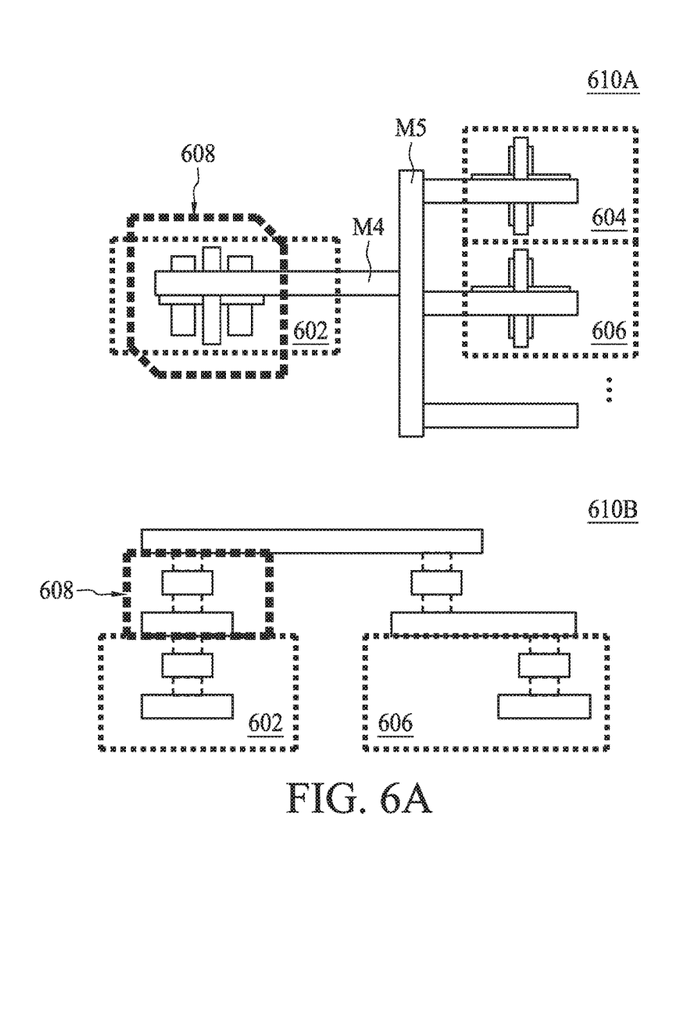
FIGS. 6A and 6B are schematic diagrams showing layouts prior to and subsequent to a VP-based ECO operation, respectively, in accordance with some embodiments.
Figure 6B:
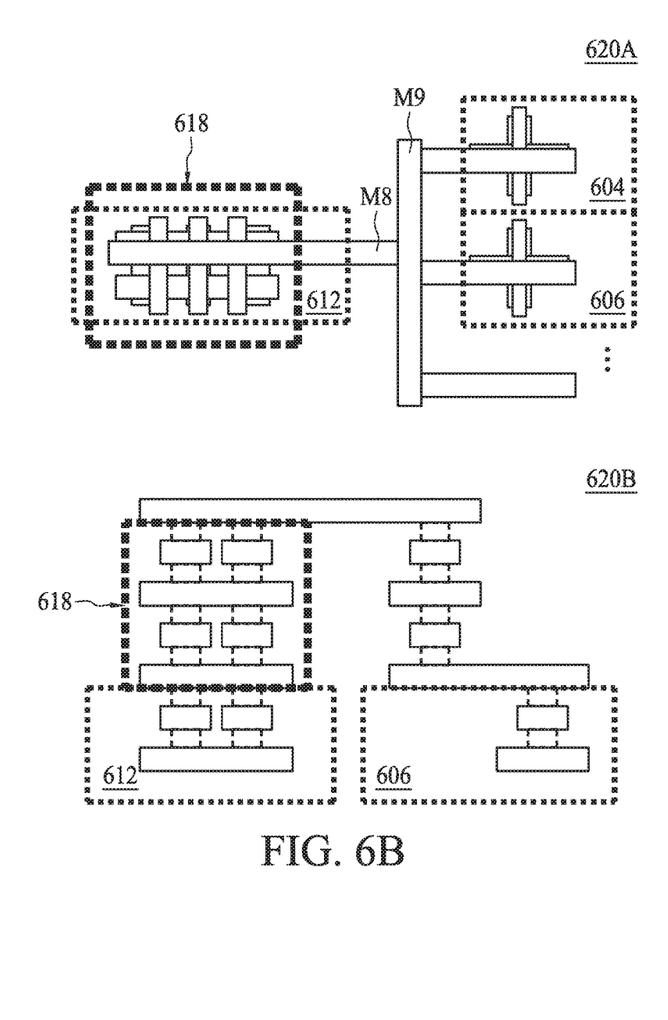

FIGS. 6A and 6B are schematic diagrams showing layouts prior to and subsequent to a VP-based ECO operation, respectively, in accordance with some embodiments. Referring to FIG. 6A, a layout 610A and its corresponding cross-sectional view 610B represent a layout prior to an ECO-based method. The layout 610A or 610B comprises a first cell 602, a second cell 604, a third cell 606 and a first metallization unit 608. In an embodiment, the first cell 602 is configured to drive the second cell 604 and the third cell 606. In some embodiments, the second cell 604 and the third cell 606 have a same cell type, e.g., a NAND or NOR gate cell. In the illustrated example, the first metallization unit 608 is a single-via stacking structure. The first metallization unit 608 includes two metal layers and two via layers conductively connecting the metal layers. As shown in the layout 610B, the first metallization unit 608 includes only one conduction path. A timing analysis shows that such layout 610A or 610B fails the timing constraints.

Referring to FIG. 6B, a layout 620A and its corresponding cross-sectional view 620B represent a layout receiving an ECO operation for managing the timing error. After the ECO operation, the layout 620A or 620B includes a fourth cell 612 in place of the first cell 602 and a second metallization unit 618 in place of the first metallization unit 608. In the illustrated example, the second metallization unit 618 is a VP structure which contains four metal layers and four via layers between the metal layers. Two or more conduction paths are established in the second metallization unit 618 and conductively connected to the fourth cell 612. Moreover, as illustrated in the layout 620B, the fourth cell 612 has a same cell type as the first cell 602, yet the number of conduction paths is increased from one to two or more than two. The fourth cell 612 may have a greater cell size than the first cell 602 due to an increased conduction path. Through the introduction of the VP structure in the second metallization unit 618, the updated cell-VP pair 612/618 can help reduce the increase in area of the fourth cell 612 as compared to the case where only the cell 602 is allowed to be changed.

Figure 7:
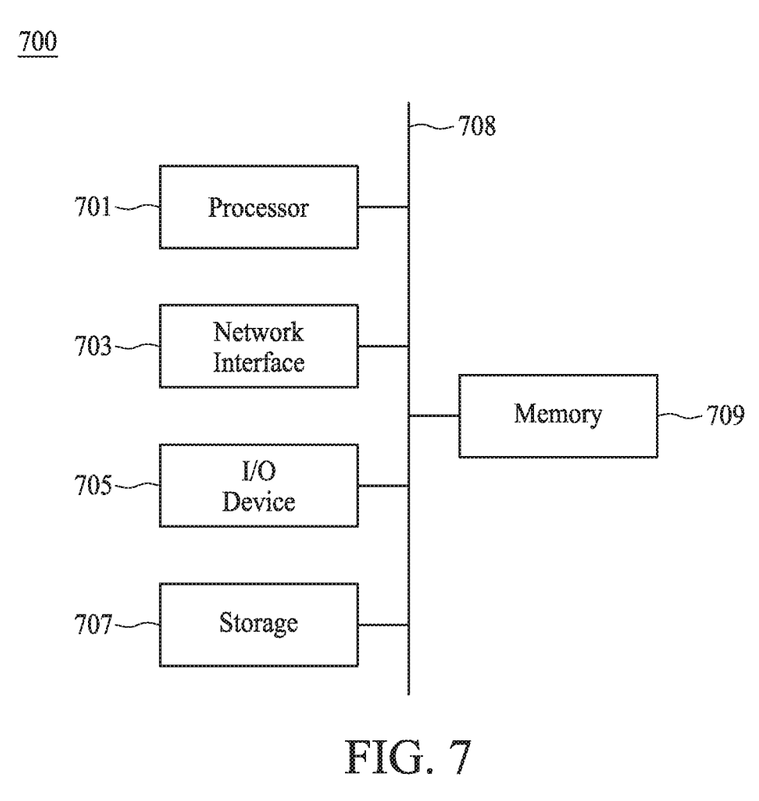
FIG. 7 is a schematic diagram of a system implementing layout designs, in accordance with some embodiments.

FIG. 7 is a schematic diagram of a system 700 implementing layout designs, in accordance with some embodiments. The system 700 includes a processor 701, a network interface 703, an input and output (I/O) device 705, a storage 707, a memory 709, and a bus 708. The bus 708 couples the network interface 703, the I/O device 705, the storage 707, the memory 709 and the processor 701 to each other.

The processor 701 is configured to execute program instructions that include a tool configured to perform the method as described and illustrated with reference to figures of the present disclosure. Accordingly, the tool is configured to execute the steps such as: provide design specifications, generate a netlist of a circuit, perform pre-layout simulation, generate an initial layout, perform routing and timing analysis, perform ECO operations, generate a consolidated netlist by incorporating the parameters, perform post-layout simulation, and verify the post-layout simulation result.

The network interface 703 is configured to access program instructions and data accessed by the program instructions stored remotely through a network (not shown).

The I/O device 705 includes an input device and an output device configured for enabling user interaction with the system 70. In some embodiments, the input device comprises, for example, a keyboard, a mouse, and other devices. Moreover, the output device comprises, for example, a display, a printer, and other devices.

The storage device 707 is configured for storing program instructions and data accessed by the program instructions. In some embodiments, the storage device 707 comprises a non-transitory computer readable storage medium, for example, a magnetic disk and an optical disk.

The memory 709 is configured to store program instructions to be executed by the processor 701 and data accessed by the program instructions. In some embodiments, the memory 709 comprises any combination of a random access memory (RAM), some other volatile storage device, a read only memory (ROM), and some other non-volatile storage device.

According to an embodiment of the present disclosure, a method performed by at least one processor includes: accessing a layout of an integrated circuit (IC), where the layout comprises a first cell coupled to a metallization unit and the metallization unit includes one of a first via pillar (VP) structure and a single-via stacking structure; determining whether the layout meets a timing constraint; and performing, in response to the layout being determined as failing the timing constraint, an engineering change order (ECO) operation by replacing the metallization unit with a second VP structure.

According to an embodiment of the present disclosure, a system comprises one or more processors and one or more programs including instructions which, when executed by the one or more processors, cause the system to: access a layout of an integrated circuit (IC), the layout comprising a first cell coupled to a metallization unit and the metallization unit including one of a first via pillar (VP) structure and a single-via stacking structure; determine whether the layout meets a timing constraint; and perform, in response to the layout being determined as failing the timing constraint, an engineering change order (ECO) operation by replacing the metallization unit with a second VP structure.

According to an embodiment of the present disclosure, a non-transitory computer readable storage medium comprises instructions which, when executed by a processor, perform the steps of: accessing a layout of an integrated circuit (IC), the layout comprising a first cell coupled to a metallization unit and the metallization unit including one of a first via pillar (VP) structure and a single-via stacking structure; determining whether the layout meets a timing constraint; and performing, in response to the layout being determined as failing the timing constraint, an engineering change order (ECO) operation by replacing the metallization unit with a second VP structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, performed by at least one processor, comprising:
   accessing a layout of an integrated circuit (IC), the layout comprising a first cell coupled to a metallization unit and the metallization unit including one of a first via pillar (VP) structure and a single-via stacking structure;
   determining whether the layout meets a timing constraint; and
   performing, in response to the layout being determined as failing the timing constraint, an engineering change order (ECO) operation by replacing the metallization unit with a second VP structure.

2. The method according to claim 1, wherein one of the first VP structure and the second VP structure at least comprises a first metal layer, a second metal layer and a via layer, and the first metal layer comprises at least two metal lines conductively coupled to the second metal layer through two respective metal vias of the via layer.

3. The method according to claim 1, further comprising providing a list containing a plurality of cells and a plurality of VP structures, wherein each of the plurality of cells is mapped to at least one of the plurality of VP structures with a preference ranking.

4. The method according to claim 3, further comprising:
identifying a plurality of cell-VP pairs wherein each of the cell-VP pairs comprises a cell and a VP structure on the list;
calculating a cost for each of the plurality of cell-VP pairs; and
selecting a second cell and the second VP structure as a target cell-VP pair in response to the target cell-VP pair as having a most beneficial cost among the plurality of cell-VP pairs.

5. The method according to claim 1, wherein the second cell has a cell size greater than a cell size of the first cell, and the ECO operation further comprises replacing the first cell with the second cell coupled to the second VP structure.

6. The method according to claim 4, wherein the cost comprises a timing cost related to a time delay of the respective cell-VP pair.

7. The method according to claim 3, further comprising:
identifying a plurality of buffer-VP pairs wherein each of the buffer-VP pairs comprises a first buffer cell and a VP structure on the list;
calculating a cost for each of the plurality of buffer-VP pairs; and
selecting the first buffer cell and the second VP structure as a target buffer-VP pair in response to the target buffer-VP pair as having a most beneficial cost among the plurality of buffer-VP pairs.

8. The method according to claim 7, wherein the ECO operation further comprises inserting the first buffer cell to the layout and coupling the first buffer cell to the second VP structure.

9. The method according to claim 8, wherein inserting the first buffer cell coupled to the second VP structure is performed in response to an ECO operation of replacing the first cell by another cell failing to meet the timing constraint.

10. The method according to claim 7, wherein the cost comprises a routing cost related to an area of the respective buffer-VP pair.

11. The method according to claim 1, further comprising performing a routing operation for the layout in response to the layout determined as meeting the timing constraint through the ECO operation.

12. The method according to claim 11, further comprising providing a database comprising data on replacing the metallization unit with second VP structure, wherein the routing operation is performed based on the database.

13. A system, comprising one or more processors and one or more programs including instructions which, when executed by the one or more processors, cause the system to:
access a layout of an integrated circuit (IC), the layout comprising a first cell coupled to a metallization unit and the metallization unit including one of a first via pillar (VP) structure and a single-via stacking structure;
determine whether the layout meets a timing constraint; and
perform, in response to the layout being determined as failing the timing constraint, an engineering change order (ECO) operation by replacing the metallization unit with a second VP structure.

14. The system according to claim 11, further comprising:
identifying a plurality of cell-VP pairs wherein each of the cell-VP pairs comprises a cell and a VP structure corresponding to the cell;
calculating a cost for each of the plurality of cell-VP pairs; and
selecting a second cell and the second VP structure as a target cell-VP pair in response to the target cell-VP pair as having a most beneficial cost among the plurality of cell-VP pairs.

15. The system according to claim 14, wherein the ECO operation further comprises replacing the first cell with the second cell coupled to the second VP given that the first cell and the second cell have a same cell type.

16. The system according to claim 14, wherein the ECO operation further comprises inserting the second cell to the layout and coupling the second cell to the second VP structure given that the second cell is a buffer cell.

17. The system according to claim 13, comprising performing a routing operation for the layout in response to the layout determined as meeting the timing constraint through the ECO operation.

18. A non-transitory computer readable storage medium, comprising instructions which, when executed by a processor, perform the steps of:
accessing a layout of an integrated circuit (IC), the layout comprising a first cell coupled to a metallization unit and the metallization unit including one of a first via pillar (VP) structure and a single-via stacking structure;
determining whether the layout meets a timing constraint; and
performing, in response to the layout being determined as failing the timing constraint, an engineering change order (ECO) operation by replacing the metallization unit with a second VP structure.

19. The non-transitory computer readable storage medium according to claim 18, further comprising:
identifying a plurality of cell-VP pairs wherein each of the cell-VP pairs comprises a cell and a VP structure;
calculating a cost for each of the plurality of cell-VP pairs; and
selecting a second cell and the second VP structure as a target cell-VP pair in response to the target cell-VP pair as having a most beneficial cost among the plurality of cell-VP pairs.

20. The non-transitory computer readable storage medium according to claim 18, wherein the cost comprises one of a timing cost related to a delay of the respective cell-VP pair and a routing cost related to an area of the respective cell-VP pair.

* * * * *